United States Patent
Trantham et al.

(10) Patent No.: US 9,564,157 B1
(45) Date of Patent: Feb. 7, 2017

(54) SYSTEM AND METHOD FOR DETECTING READER-WRITER OFFSET IN A HEAT-ASSISTED MAGNETIC RECORDING HEAD

(71) Applicant: Seagate Technology LLC, Cupertino, CA (US)

(72) Inventors: Jon Trantham, Chanhassen, MN (US); Tim Rausch, Farmington, MN (US); Jason C. Jury, Minneapolis, MN (US); Mark Allen Gaertner, Vadnais Heights, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 14/832,186

(22) Filed: Aug. 21, 2015

(51) Int. Cl.
| | | |
|---|---|---|
| *G11B 11/00* | (2006.01) | |
| *G11B 5/48* | (2006.01) | |
| *G11B 5/00* | (2006.01) | |
| *G11B 11/105* | (2006.01) | |
| *G11B 5/31* | (2006.01) | |
| *G11B 7/007* | (2006.01) | |
| *G11B 7/00* | (2006.01) | |

(52) U.S. Cl.
CPC ............ *G11B 5/4886* (2013.01); *G11B 5/314* (2013.01); *G11B 7/00* (2013.01); *G11B 7/00745* (2013.01); *G11B 11/1058* (2013.01); *G11B 11/10532* (2013.01); *G11B 11/10543* (2013.01); *G11B 11/10558* (2013.01); *G11B 2005/0021* (2013.01); *G11B 2220/2525* (2013.01)

(58) Field of Classification Search
None
See application file for complete search history.

(56) References Cited

U.S. PATENT DOCUMENTS

| | | | |
|---|---|---|---|
| 6,421,197 | B1 | 7/2002 | Abdelnour |
| 6,510,017 | B1 | 1/2003 | Abdelnour |
| 6,671,790 | B2 | 12/2003 | Gay Sam et al. |
| 6,754,030 | B2 | 6/2004 | Seng et al. |
| 6,873,488 | B2 | 3/2005 | Teo et al. |
| 7,173,781 | B2 | 2/2007 | Lim et al. |
| 7,440,221 | B2 | 10/2008 | Tsuchinaga et al. |
| 7,602,575 | B1 | 10/2009 | Lifchits et al. |
| 7,982,994 | B1 | 7/2011 | Erden et al. |
| 8,154,811 | B2 | 4/2012 | Barsotti et al. |
| 8,264,918 | B2 | 9/2012 | Hashimoto et al. |
| 8,416,646 | B2 | 4/2013 | Huang et al. |
| 8,913,335 | B2 | 12/2014 | Coker et al. |

(Continued)

OTHER PUBLICATIONS

U.S. Appl. No. 14/812,032, filed Jul. 29, 2015, Rausch et al.
File History for U.S. Appl. No. 14/812,032.

*Primary Examiner* — Tan X Dinh
(74) *Attorney, Agent, or Firm* — Hollingsworth Davis, LLC

(57) ABSTRACT

An apparatus comprises a heat-assisted magnetic recording head configured to write to and read from a magnetic recording medium. The head comprises a reader and a writer including a near-field transducer (NFT). The reader comprises a center which is laterally offset relative to a center of the writer to define a reader-writer offset (RWO) therebetween. A magnetic recording medium comprises a plurality of tracks. The plurality of tracks comprises at least one track used as a region to test for a shift in the RWO. A processor is coupled to the recording head and configured to detect the RWO shift.

20 Claims, 12 Drawing Sheets

(56) References Cited

U.S. PATENT DOCUMENTS

| | | | |
|---|---|---|---|
| 8,941,944 B1 | 1/2015 | Dai et al. | |
| 9,093,091 B1 | 7/2015 | Chu et al. | |
| 2002/0075585 A1* | 6/2002 | Luong | G11B 5/455 360/31 |
| 2006/0056092 A1* | 3/2006 | Ehrlich | G11B 5/59627 360/75 |
| 2006/0056093 A1* | 3/2006 | Ehrlich | G11B 5/59627 360/75 |
| 2006/0109578 A1* | 5/2006 | Zayas | G11B 5/455 360/31 |
| 2007/0230026 A1 | 10/2007 | Takaishi | |
| 2007/0247742 A1* | 10/2007 | Saikawa | G11B 5/59633 360/75 |
| 2008/0030890 A1* | 2/2008 | Ohzeki | G11B 5/59644 360/77.14 |
| 2008/0239906 A1 | 10/2008 | Akagi et al. | |
| 2009/0310249 A1* | 12/2009 | Michinaga | G11B 5/59627 360/77.02 |
| 2014/0192435 A1 | 7/2014 | Buch | |

* cited by examiner

SYSTEM AND METHOD FOR DETECTING READER-WRITER OFFSET IN A HEAT-ASSISTED MAGNETIC RECORDING HEAD

SUMMARY

Embodiments of the disclosure are directed to an apparatus comprising a heat-assisted magnetic recording head configured to write to and read from a magnetic recording medium. The head comprises a reader and a writer including a near-field transducer (NFT). The reader comprises a center which is laterally offset relative to a center of the writer to define a reader-writer offset (RWO) therebetween. A magnetic recording medium comprises a plurality of tracks. The plurality of tracks comprises at least one track used as a region to test for a shift in the RWO. A processor is coupled to the recording head and configured to detect the RWO shift.

Other embodiments are directed to a method comprising moving a heat-assisted magnetic recording head relative to a magnetic recording medium comprising a plurality of tracks. The head comprises a reader and a writer including a near-field transducer (NFT). The reader comprises a center which is laterally offset relative to a center of the writer to define a reader-writer offset (RWO) therebetween. The method also comprises writing sectors of data to at least one track used as a region for RWO shift testing, reading the data written to the test region, determining a metric of readability in response to reading the data, and detecting a shift in the RWO using the readability metric.

Some embodiments are directed to an apparatus comprising a recording head configured to write to and read from a magnetic recording medium. The head comprises a reader and a writer. The reader comprises a center which is laterally offset relative to a center of the writer to define a reader-writer offset (RWO) therebetween. A magnetic recording medium comprises a plurality of tracks. The plurality of tracks comprises at least one track used as a region to test for a shift in the RWO. A processor is coupled to the recording head and configured to detect the RWO shift.

The above summary is not intended to describe each disclosed embodiment or every implementation of the present disclosure. The figures and the detailed description below more particularly exemplify illustrative embodiments.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure generally relates to detecting changes in an offset between a writer and a reader (referred to herein as reader-writer offset or RWO) of a recording, such as within a Heat-Assisted Magnetic Recording (HAMR) head. Fast detection of RWO changes is highly desirable in a disk drive. It is undesirable to consume much time detecting RWO changes, since this detracts from time where the drive could be servicing user commands. It is therefore desirable to quickly characterize the RWO of the recording head, especially whether the RWO has significantly changed. Embodiments are directed to a variety of techniques for detecting RWO of a recording head, including a recording head having a multiplicity of readers. Embodiments are directed to techniques that detect RWO of a recording head very quickly, such as within about one disk revolution.

Figure 1:
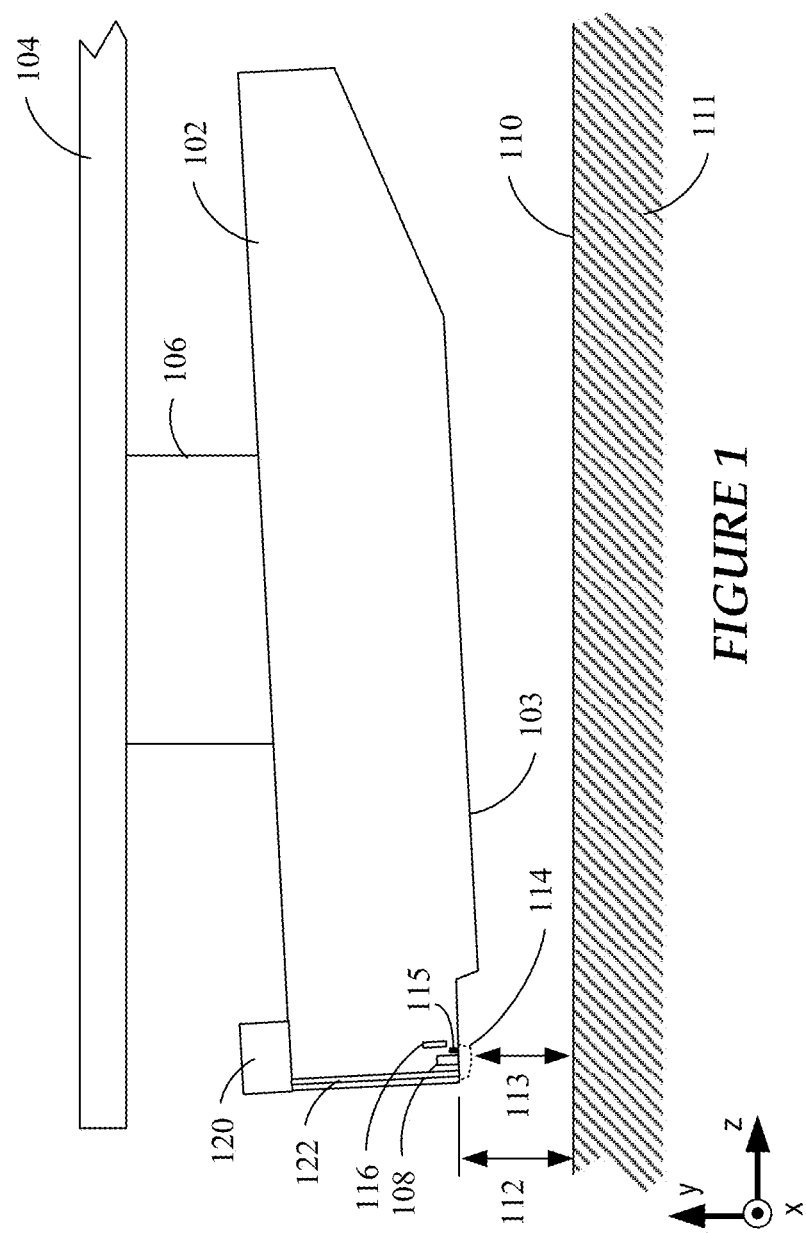
FIG. 1 is a schematic representation of a slider in which the various embodiments disclosed herein may be implemented.

Referring now to FIG. 1, a block diagram shows a side view of a read/write transducer 102 according to a representative embodiment. The read/write transducer 102 may be used in a magnetic data storage device, e.g., a disk drive. The read/write transducer 102 may also be referred to herein as a slider, read head, recording head, etc. The read/write transducer 102 is coupled to an arm (not shown) by way of a suspension 104 and a gimbal 106 that allows some relative motion between the read/write transducer 102 and arm. The read/write transducer 102 includes read/write transducers 108 at a trailing edge that are held proximate to a surface 110 of a magnetic recording medium 111, e.g., magnetic disk. The read/write transducer 102 shown in FIG. 1 is configured as a HAMR recording head, which includes a laser 120 and a waveguide 122. The waveguide 122 delivers light from the laser 120 to components (e.g., a near-field transducer) near the read/write transducers 108.

When the read/write transducer 102 is located over surface 110 of recording medium 111, a flying height 112 is maintained between the read/write transducer 102 and the surface 110 by a downward force of arm 104. This downward force is counterbalanced by a gas cushion that exists from aerodynamic forces between the surface 110 and an air bearing surface 103 (also referred to herein as a "media-facing surface") of the read/write transducer 102 when the recording medium 111 is rotating. It is desirable to maintain a predetermined slider flying height 112 over a range of disk rotational speeds during both reading and writing operations to ensure consistent performance. Region 114 is a "close point" of the read/write transducer 102, which is generally understood to be the closest spacing between the read/write transducers 108 and the magnetic recording medium 111, and generally defines the head-to-medium spacing 113. To account for both static and dynamic variations that may affect slider flying height 112, the read/write transducer 102 may be configured such that a region 114 of the read/write transducer 102 can be configurably adjusted during operation in order to finely adjust the head-to-medium spacing 113. This is shown in FIG. 1 by a dotted line that represents a change in geometry of the region 114. In this example, the geometry change may be induced, in whole or in part, by an increase or decrease in temperature of the region 114 via a heater 116, the magnetic writer, or the near field transducer. A fly-height sensor 115 is shown situated at or near the close point 114 (e.g., adjacent the read/write transducers 108, such as near the near-field transducer) or can be positioned at other location of the ABS 103.

Figure 2:
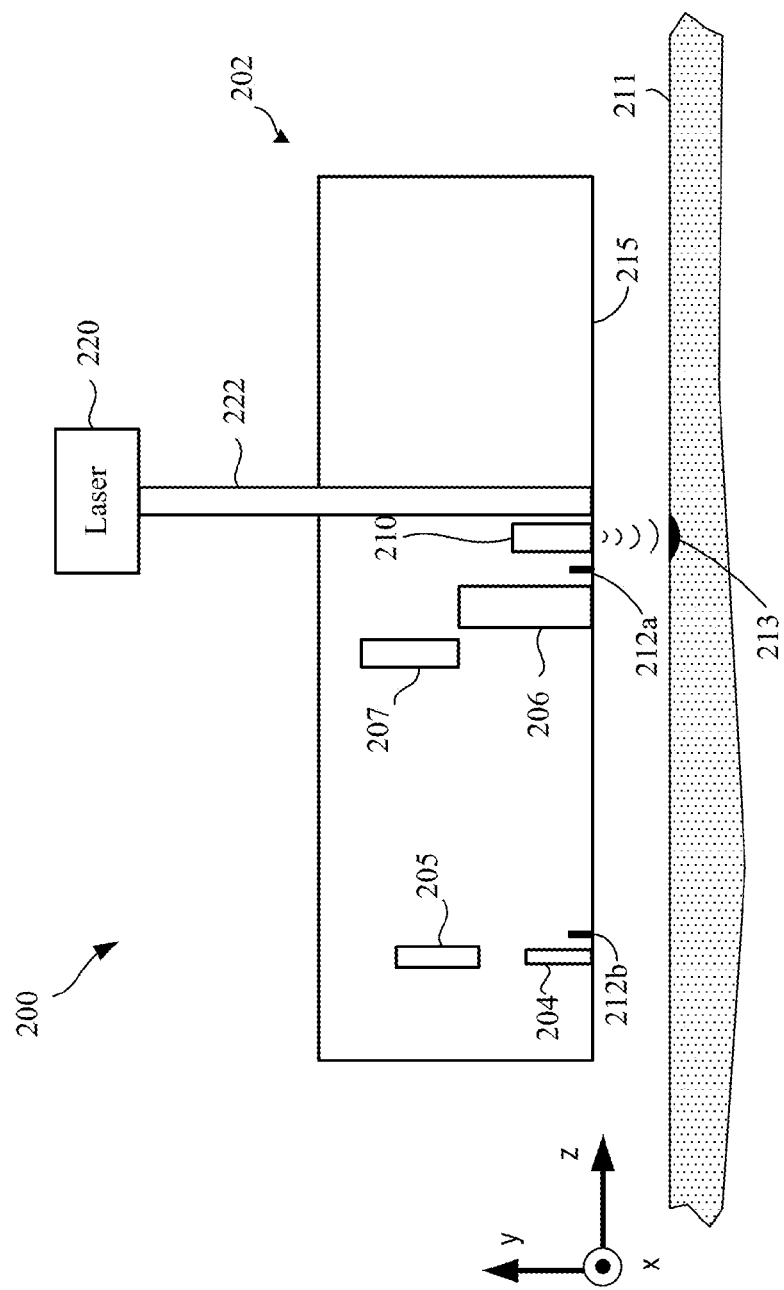
FIG. 2 shows a heat-assisted magnetic recording (HAMR) head arrangement in accordance with various embodiments.

FIG. 2 shows a HAMR head arrangement 200 in accordance with various embodiments. The recording head arrangement 200 includes a slider 202 positioned proximate a rotating magnetic medium 211. The slider 202 includes a reader 204 and a writer 206 proximate the ABS 215 for respectively reading and writing data from/to the magnetic medium 211. The writer 206 is located adjacent a near-field transducer (NFT) 210 which is optically coupled to a light source 220 (e.g., laser diode) via a waveguide 222. The light source 220 can be mounted external, or integral, to the slider 202. During writing, the light source 220 energizes the NFT 210 via the waveguide 222. The writer 206 includes a corresponding heater 207, and the reader 204 includes a corresponding heater 205 according to various embodiments. The writer heater 207 can be powered to cause protrusion of the ABS 215 predominately in the ABS region at or proximate the writer 206, and the reader heater 205 can be powered to cause protrusion of the ABS 215 predominately in the ABS region at or proximate the reader 204. Power can be controllably delivered independently to the heaters 207 and 205 to adjust the fly height (e.g., clearance) of the slider 202 relative to the surface of the recording medium 211. One or more sensors 212a, 212b can be situated at various locations on the slider 202 at or near the ABS 215 for purposes of monitoring temperature, head-medium spacing changes, and head-medium contact.

A HAMR device utilizes the types of optical devices described above to heat a spot of magnetic recording media (e.g., hard disk) in order to overcome superparamagnetic effects that limit the areal data density of typical magnetic media. When writing with a HAMR device, the electromagnetic energy (e.g., laser or light) is concentrated onto a small hot spot 213 over the track of the magnetic medium 211 where writing takes place, as shown in FIG. 2. The light from the source 220 propagates to the NFT 210, e.g., either directly from the source 220 or through the mode converter or by way of a focusing element. Other optical elements, such as couplers, mirrors, prisms, etc., may also be formed integral to the slider.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 213 is on the order of 50 nm or less. Thus, the desired hot spot size is well below half the wavelength of the light. Optical focusers cannot be used to obtain the desired hot spot size, being diffraction limited at this scale. As a result, the NFT 210 is employed to create a hot spot on the media.

The NFT 210 is a near-field optics device configured to generate local surface plasmon resonance at a designated (e.g., design) wavelength. The NFT 210 is generally formed from a thin film of plasmonic material (e.g., gold, silver, copper) on a substrate. In a HAMR slider 202, the NFT 210 is positioned proximate the write pole of the writer 206. The radiating end of the NFT 210 is aligned with the plane of the ABS 215 parallel to the read/write surface of the magnetic medium 211. The NFT 210 achieves surface plasmon resonance in response to the incident electromagnetic energy. The plasmons generated by this resonance are emitted from the NFT 210 towards the magnetic medium 211 where they are absorbed to create the hot spot 213. At resonance, a high electric field surrounds the NFT 210 due to the collective oscillations of electrons at the metal surface (e.g., substrate) of the magnetic medium 211. At least a portion of the electric field surrounding the NFT 210 tunnels into, and gets absorbed by, the magnetic medium 211, thereby raising the temperature of the spot 213 on the medium 211 facilitating the recording of data.

The writing process implemented by a HAMR device generates high temperatures at the NFT 210, as well as the hot spot 213 on the magnetic medium 211. The elevated temperatures associated with HAMR device operation have been found to sometimes (undesirably) alter the operation of the NFT 210, such as by slightly changing the shape of the NFT 210 or gradient of energy emitted by the NFT 210. Such slight changes of the NFT 210 result in a change in the location of the hot spot 213 on the medium 211 with respect to the reader 204 (which is used for positioning) and, therefore, the location of the data written to the medium 211. As a consequence of this change in hot spot location on the medium 211, the data is no longer written to the centerline of a data track, for example, but to a location offset laterally of the track centerline. Changes in the down track position are also possible which manifest themselves as a lateral (cross-track) offset only when writing at different head skew angles (with respect to the data track). This, in turn, results in errors when the reader 204 attempts to read the data and also leads to erasure of adjacent track data when the offset thermal spot 213 encroaches on the neighboring tracks.

Figure 3:
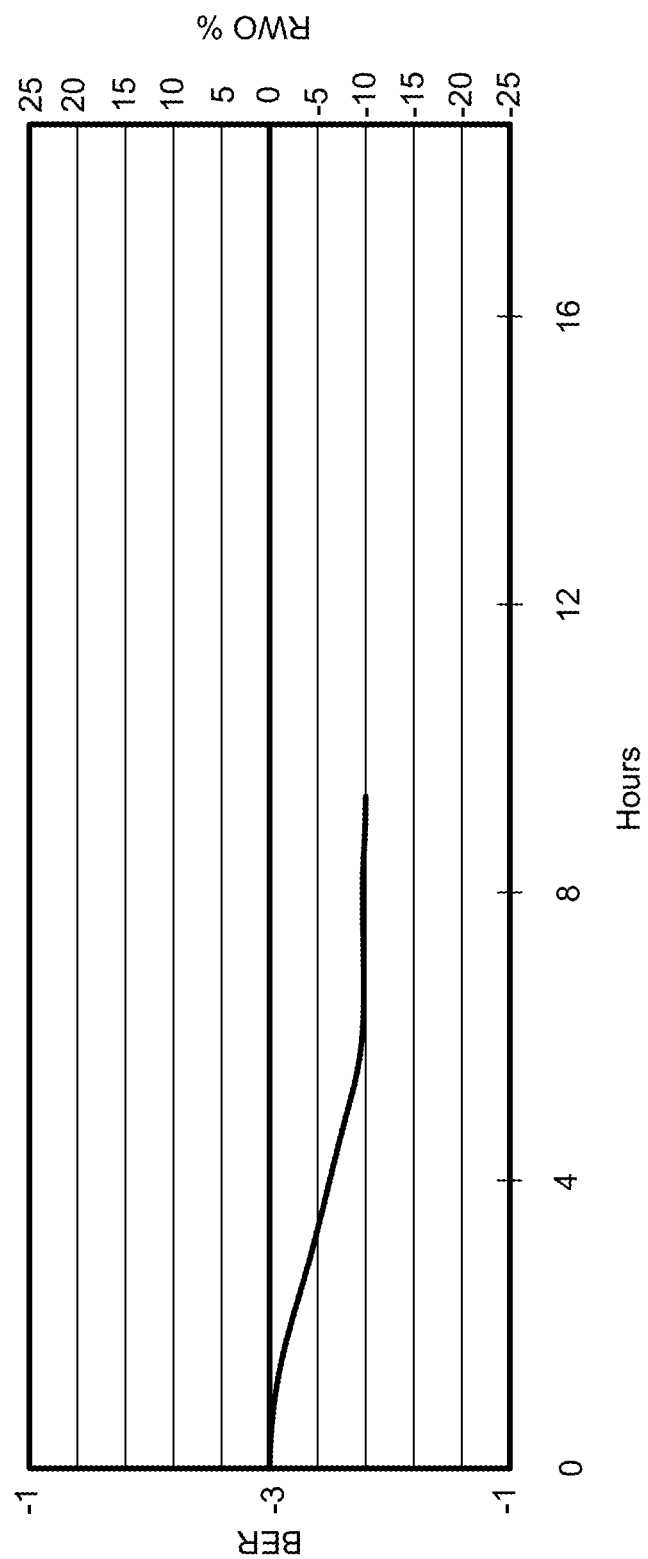
FIG. 3 shows an example of how RWO offset for a HAMR head changes with time in accordance with various embodiments.

Consequently, in many current HAMR systems, the reader-writer offset is not constant with time. FIG. 3 shows an example of how the RWO offset for a HAMR head changes with time during recording with a zero degree skew angle. In the graph shown in FIG. 3, the left y-axis is bit error rate (BER), the right y-axis is percent change of RWO, and the x-axis is hours. In this illustrative example, over a course of about 6 hours of writing (i.e., the writer and laser/NFT constantly energized), the RWO shifted by approximately 10% of the track pitch. Changes in the RWO in a HAMR head are due primarily to changes in the NFT, however the methods are effective for RWO changes no matter the cause. In an NFT configuration having an elongated peg connected to an enlarged portion, for example, it has been found that degradation of the peg over time causes changes in the focal point of energy emitted by the peg over time. The RWO in a HAMR head can change somewhat unpredictably, changing relatively slowly for periods of time, and remaining relatively stable for other periods of time.

As the RWO offset changes over time, the shift can negatively impact the performance of the drive in two ways. First, when the RWO changes, the head is no longer writing a data track at the track center. This means that when the reader reads back the signal, it is not reading from the track center impairing performance. Second, if there is an RWO that changes with time, data tracks written with a shifting RWO will be encroaching on neighboring tracks. For example, suppose data is written on track n and on track n+1 with a stable RWO. Since both tracks have the same RWO, normal reading and writing operations can occur. After a period of time, assume the RWO changes by 10% towards track n+1. If data is then written on track n, the head will be encroaching on track n+1 and could erase the data written on track n+1.

Figure 4:
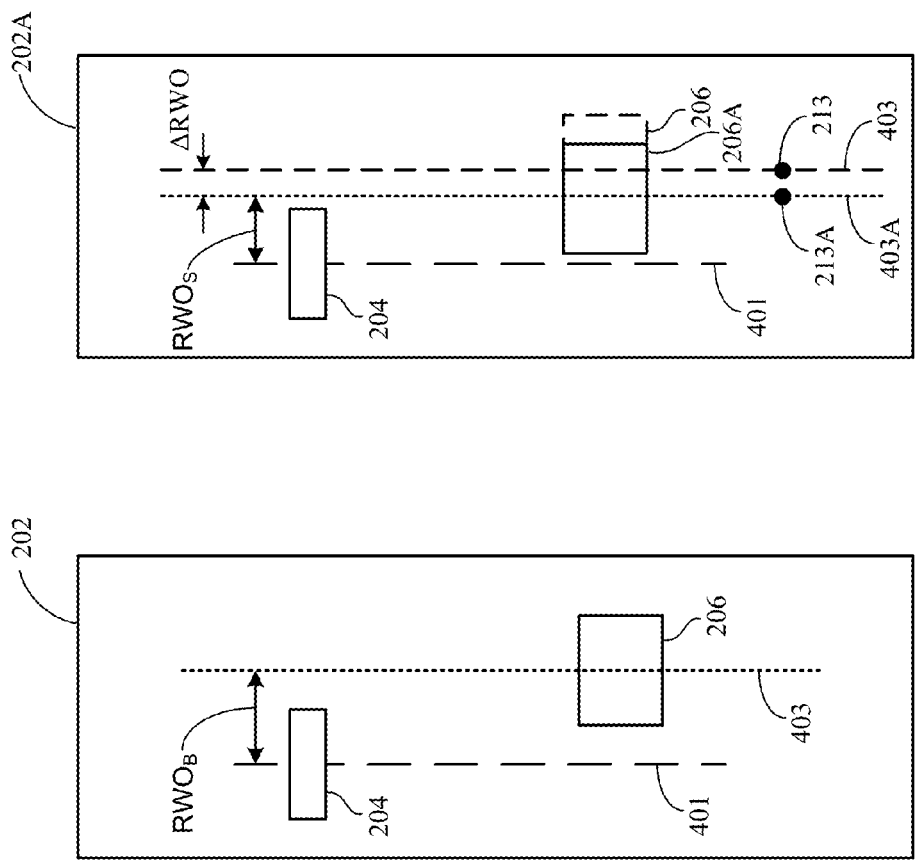
FIG. 4A is an illustration of a HAMR slider which includes a writer spaced apart from a reader by a baseline RWO in accordance with various embodiments.
FIG. 4B is an illustration of a HAMR slider which includes a writer spaced apart from a reader by a shifted RWO in accordance with various embodiments.

FIG. 4A is an illustration of a slider 202 which includes a writer 206 spaced apart from a reader 204 by a baseline RWO ($RWO_B$). The baseline $RWO_B$ represents a designed amount of lateral offset between the writer 206 and the reader 204. In FIG. 4A, the center of the reader 204 is shown tracking the centerline 401 of a track of the magnetic recording medium. FIG. 4B illustrates a slider 202A which includes a shifted $RWO_S$ (relative to the baseline $RWO_B$ shown in FIG. 4A) defined between the writer 206 and the reader 204. As was previously discussed, shifting of the RWO can occur in a HAMR head due to elevated temperatures affecting the NFT (e.g., structural changes of the adjacent NFT and shifting of the focus of energy emitted by the NFT), physical damage to the NFT from a particle strike, etc.

In the illustration of the slider 202A shown in FIG. 4B, the center of the reader 204 is shown tracking the centerline 401 of a data track. FIG. 4B shows a centerline 403 of the writer 206 assuming a baseline $RWO_B$ exists between the writer 206 and reader 204, as is the case in FIG. 4A. FIG. 4B also shows a lateral shift of the centerline 403 of the writer 206 to a shifted centerline 403A due to the shift in reader-writer offset from $RWO_B$ to $RWO_S$. The magnitude of this shift in reader-writer offset is shown as ARWO in FIG. 4B. As a result of the RWO shift, the hot spot 213A created by the writer 206A is shifted from its baseline location 213 by a distance ARWO, which would have been the hot spot location had the RWO shift not occurred. As a result of the RWO shift from $RWO_B$ to $RWO_S$, the shifted hot spot 213A is no longer located at the designed reader-writer offset ($RWO_B$) when the reader tracks the centerline of the data track, leading to read errors, some of which may be recoverable and some of which may not.

Figure 5:
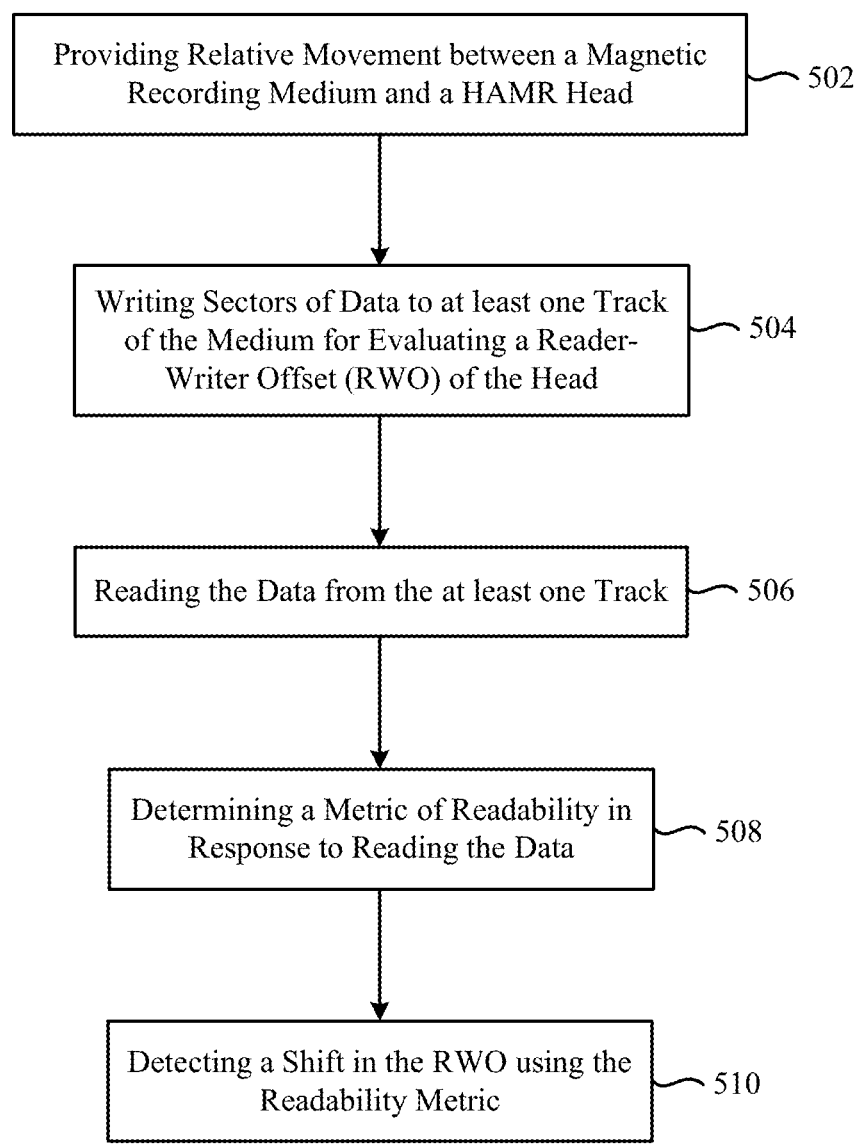
FIG. 5 illustrates various processes for detecting a shift in the RWO of a recording head in accordance with various embodiments.

Turning now to FIG. 5, there is illustrated various processes for detecting a shift in the RWO of a recording head in accordance with various embodiments. The methodology illustrated in FIG. 5 involves providing 502 relative movement between a magnetic recording medium and a recording head, such as a HAMR head. The methodology also involves writing 504 sectors of data to at least one track of the recording medium for evaluating RWO of the head. Data is read 506 from at least one track, and a metric of readability is determined 508 in response to reading the data from at least one track. The methodology further involves detecting 510 a shift in the RWO using the readability metric. A corrective action may be performed in response to detecting a shift in the head's RWO.

Figure 6:
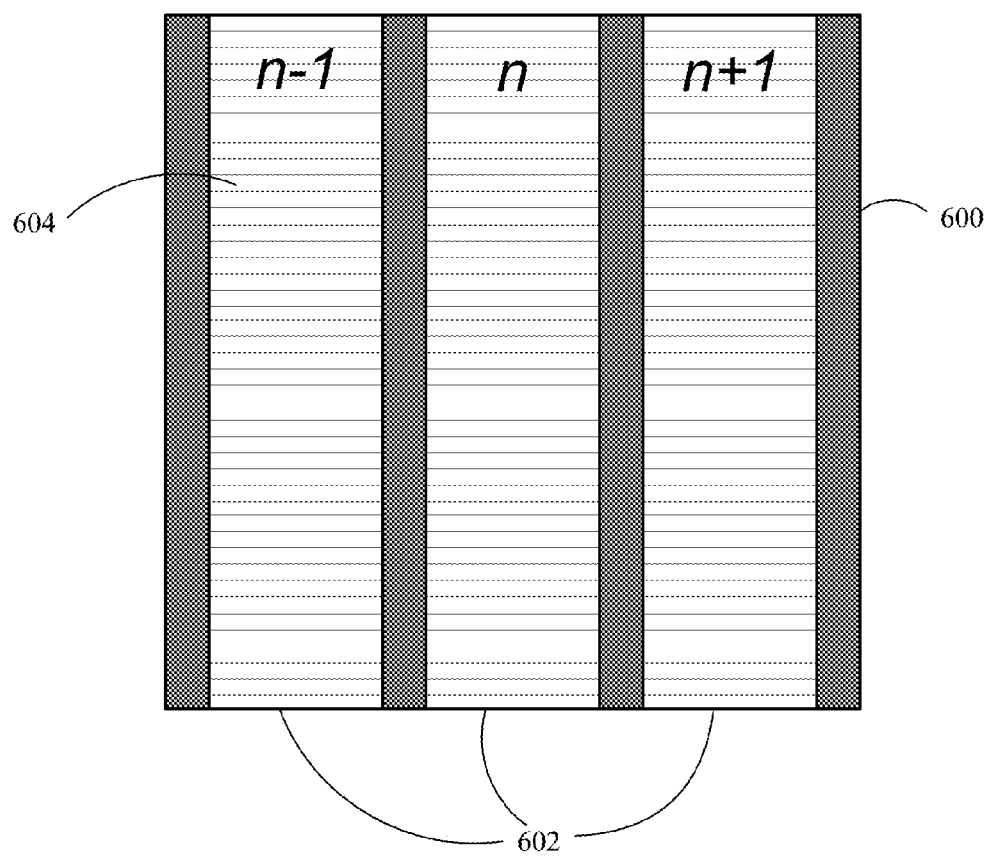
FIG. 6 illustrates a portion of a magnetic recording medium which can be used for detecting a shift in RWO of a recording head in accordance with various embodiments.

FIG. 6 illustrates a portion of a magnetic recording medium 600 which can be used for detecting a shift in RWO of the recording head in accordance with various embodiments. The medium 600 shown in FIG. 6 includes a plurality of tracks 602. Each of the tracks 602 comprises a plurality of data sectors 604. In some embodiments, the tracks 602 are reserved (dedicated) for detecting a shift in RWO and, as such, the tracks 602 are not used for storing user data. In other embodiments, the tracks 602 can be tracks used for both storing user data and detecting a shift in RWO, for example, tracks normally used for media user-data caching can be used when the drive is idle.

In FIG. 6, three tracks 602 of the magnetic recording medium 600 are shown; a center track, n, and two outer tracks, n−1 and n+1. The three tracks 602 shown in FIG. 6 are adjacent to each other, with an erase band disposed between each of the tracks 602. The tracks 602 can be located anywhere on the recording medium 600. In some implementations, the tracks 602 can be located at a diameter of the medium 600 where the offset between the writer and one or more readers is at its largest. The processes illustrated in FIG. 7 can be performed on the three tracks 604 of the medium 600 shown in FIG. 6.

Figure 7:
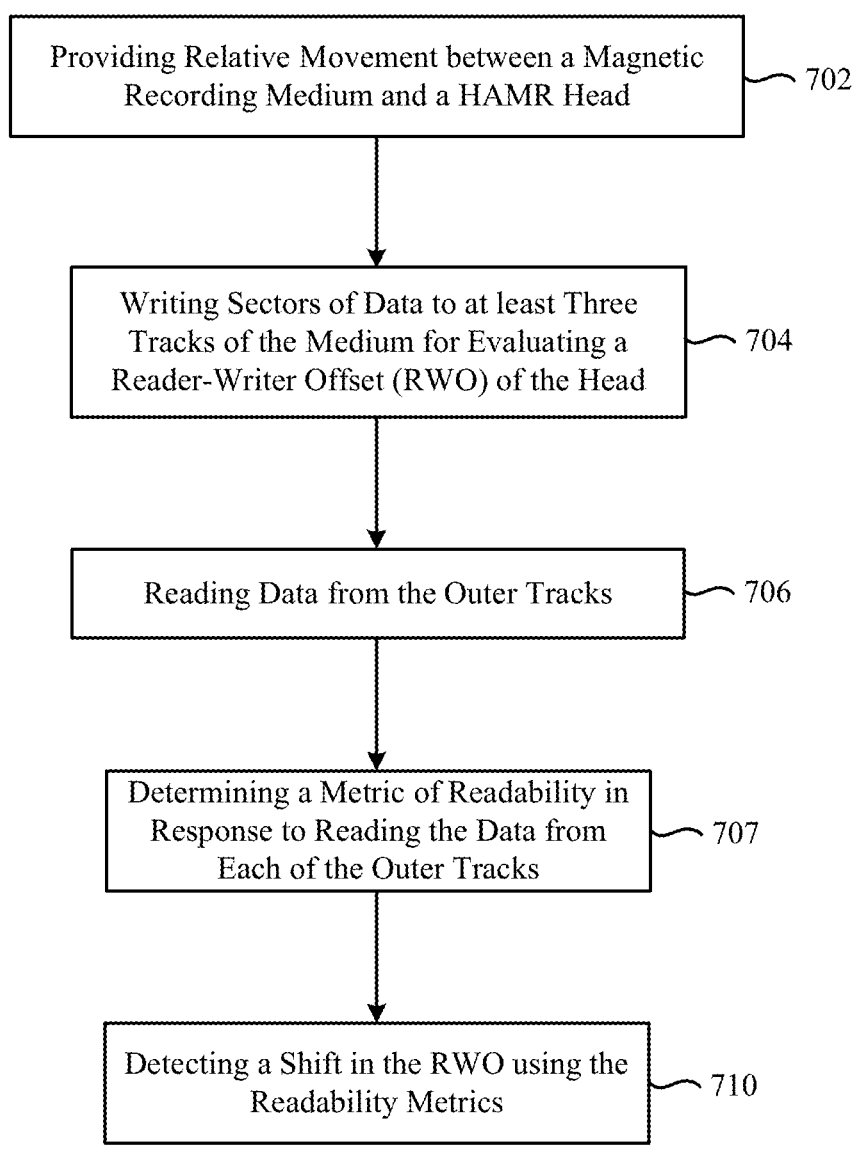
FIG. 7 illustrates various processes for detecting a shift in the RWO of a recording head using three tracks of a recording medium in accordance with various embodiments.

FIG. 7 illustrates various processes for detecting a shift in the RWO of a recording head using three tracks 602 of the recording medium 600 in accordance with various embodiments. The processes illustrated in FIG. 7 are directed to an embodiment in which basic recoverability of sectors can be used as a readability metric to detect a shift in the RWO of a recording head, such as a HAMR head. The methodology shown in FIG. 7 involves providing 702 relative movement between the recording medium 600 and the recording head. Data sectors 604 are written 704 to at least three tracks 602 (n, n+1, n−1) of the medium 600 for evaluating the RWO of the head.

Data is read 706 from the outer tracks 602 (n+1 and n−1), and a metric of readability is determined 707 in response to reading the data from each of the outer tracks 602. The readability metric can include one or more of bit error rate (BER), track BER center offset, off-track read capability (OTC) location, and a sectors recoverable metric, for example. In a multi-sensor magnetic recording (MSMR) head, these metrics can further be kept for more than one sensor within the head. A shift in the RWO of the head is detected 710 using the readability metrics. For example, the readability metrics derived from reading the outer tracks 602 (n+1 and n−1) can be compared to predetermined thresholds. Exceeding or deviating from a predetermined threshold by a readability metric indicates an excessive or unacceptable shift in the RWO of a recording head subject to evaluation. In response to detecting an excessive or unacceptable shift in a head's RWO, an alert signal can be generated and communicated to a controller of the disk drive and/or a host processor. In some implementations, corrective action can be performed in response to detecting an excessive shift in the RWO of the head. Examples of corrective actions include performing further RWO characterization (for example, at different track locations), changing the compensation (e.g., reader offset or jog) for the RWO, recalibrating the applied laser current, asserting a SMART (self-monitoring) annunciation, etc.

Figure 8:
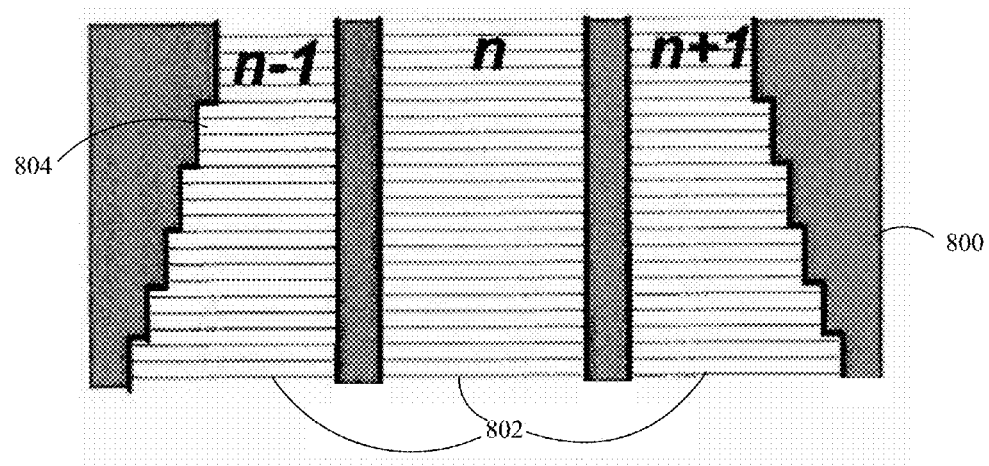
FIG. 8 illustrates a portion of a magnetic recording medium which can be used for detecting a shift in RWO of a recording head in accordance with various embodiments.

FIG. 8 illustrates a portion of a magnetic recording medium 800 which can be used for detecting a shift in RWO of a recording head in accordance with various embodiments. The medium 800 shown in FIG. 8 includes three adjacent tracks 802 (n, n+1, n−1) separated by erase bands. A center track, n, includes data sectors 804 having a consistent width. The two outer tracks, n+1 and n−1, include data sectors 804 having different widths arising from being written closer to track n and then eventually being overwritten by track n. In particular, the two outer tracks, n+1 and n−1, include data sectors 804 that have a progressively reduced width. The data sector pattern illustrated in FIG. 8 can be generated and used for RWO shift detection according to the methodology shown in FIG. 9.

Figure 9:
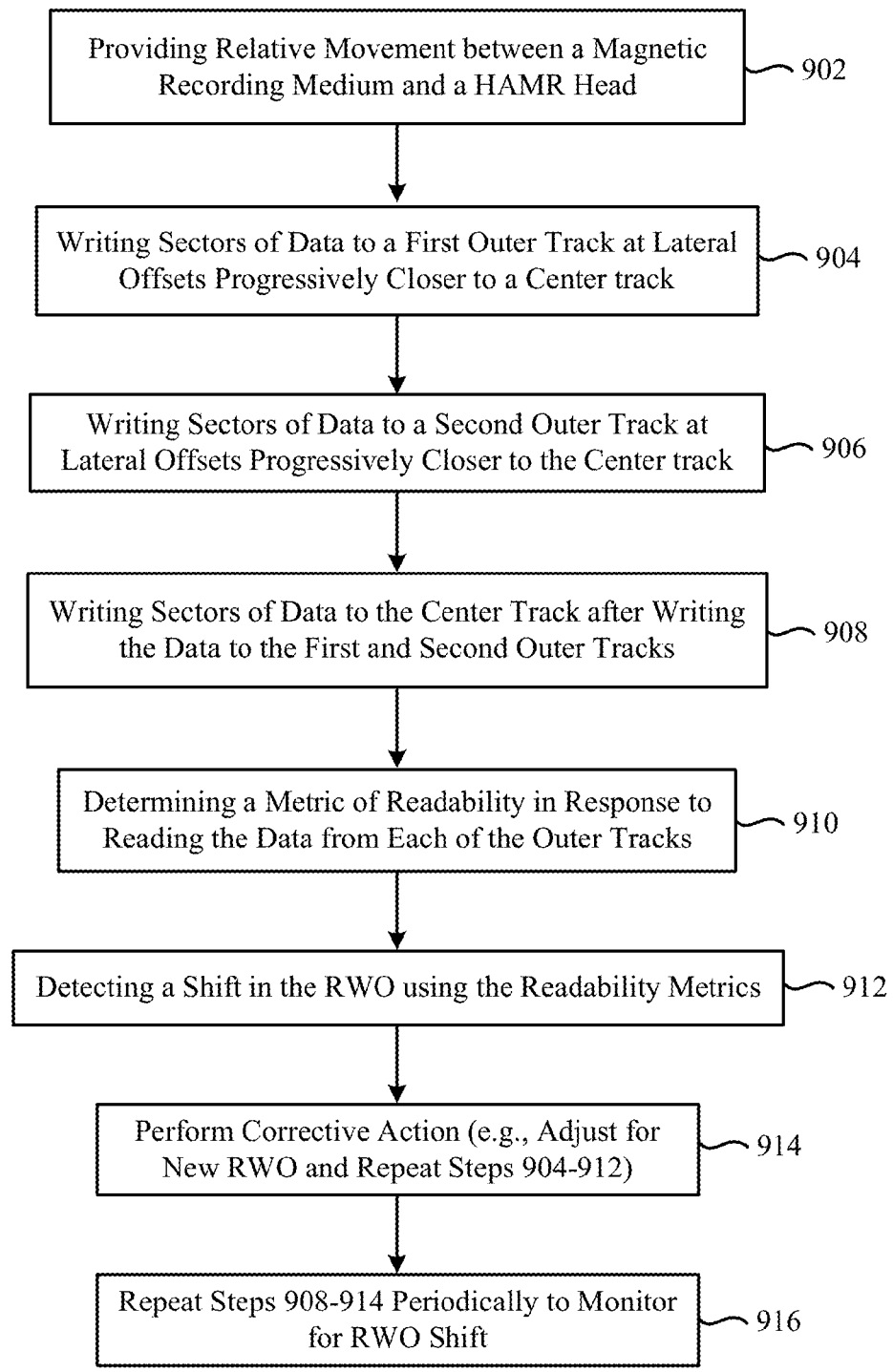
FIG. 9 illustrates various processes for detecting a shift in the RWO of a recording head using three tracks of the magnetic recording medium shown in FIG. 8 in accordance with various embodiments.

FIG. 9 illustrates various processes for detecting a shift in the RWO of a recording head using three tracks 802 of the magnetic recording medium 800 shown in FIG. 8. The methodology shown in FIG. 9 involves providing relative movement 902 between the medium 800 and a recording head, such as a HAMR head. The methodology involves writing 904 sectors of data to a first outer track, n−1, at lateral offsets progressively closer to the center track, n. Writing sectors of data 804 in this manner results in partially writing the data sectors 804 to the first outer track, n−1, and partially writing the data sectors 804 across the erase band and into the center track, n. The methodology also involves writing 906 sectors of data to a second outer track, n+1, at lateral offsets progressively closer to the center track, n. Writing sectors of data 804 in this manner results in partially writing the data sectors 804 to the second outer track, n+1, and partially writing the data sectors 804 across the erase band and into the center track, n. After writing data sectors 804 to the first and second outer tracks, n−1 and n+1, sectors of data 804 are written 908 to the center track, n. The writing of track n may occur long after tracks n−1 and n+1 have been written. Writing data sectors 804 to the center track, n, in this manner effectively erases or writes over the partial data sectors written to the center track, n, while writing to the first and second outer tracks, n−1 and n+1.

The methodology shown in FIG. 9 further includes determining 910 a metric of readability in response to reading the data sectors 804 from each of the first and second outer tracks n−1 and n+1. A shift in the RWO of the recording head is detected 912 using the readability metrics. In response to detecting the RWO shift, corrective action can be performed 914, such as performing further RWO characterization, changing the compensation for the detected RWO, and generating an alert. In some embodiments, steps 904 through 912 can be repeated after adjusting for a new RWO. In some embodiments, steps 908 through 914 can be periodically repeated 916 to monitor for a shift in a head's RWO.

Figure 10:
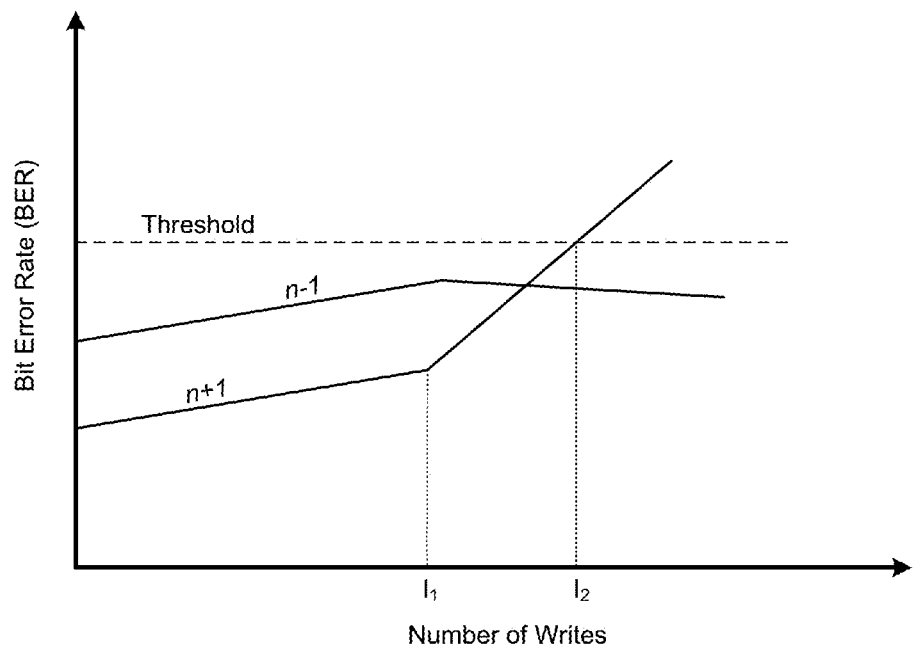
FIG. 10 illustrates readability metrics generated when reading the outer tracks of the magnetic recording medium shown in FIG. 8 in accordance with the methodology of FIG. 9.

FIG. 10 illustrates readability metrics generated when reading the first and second outer tracks, n−1 and n+1 in step 910 of FIG. 9. The readability metrics illustrated in FIG. 10 are represented as bit error rates (BERs) as a function of the number of write operations ($I_n$) for a particular recording head. It can be seen in FIG. 10 that the BER for the first outer track, n−1, increases modestly and then plateaus (near $I_1$) to a nearly constant (or even somewhat declining) BER value. The BER for the second outer track, n+1, however, increases modestly and then significantly increases at $I_1$. At $I_2$, it can be seen that the BER for the second outer track, n+1, exceeds a threshold. The threshold represents a bit error rate due to a shift in the RWO for a particular head that has become excessive or unacceptable. It can also be seen that the BER for the first outer track, n−1, remains below the threshold at $I_2$. It is noted that in some cases the BER of one of the tracks may improve as the BER changes, this may seem counterintuitive at first, but can arise from the reduction of adjacent track interference coming from the gradual erasure of adjacent track signal. The stepped data sector pattern shown in FIG. 8 advantageously provides for both detection of a shift in the RWO of a recording head and the direction and magnitude of the RWO shift.

Figure 11:
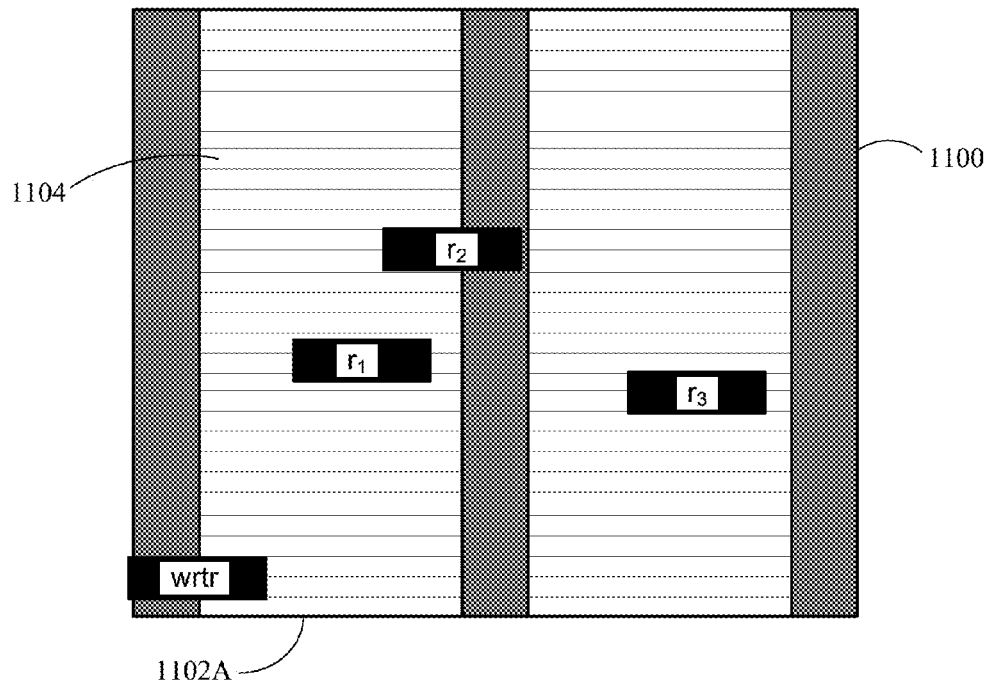
FIG. 11 illustrates a portion of a magnetic recording medium which can be used for detecting a shift in RWO of a recording head in accordance with various embodiments.
Figure 12:
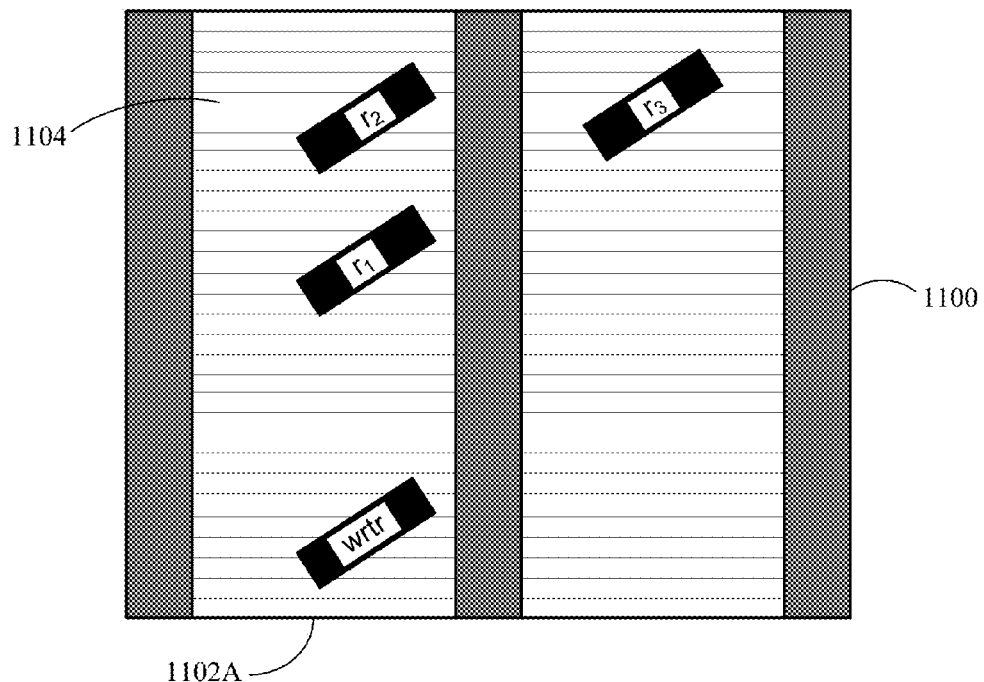
FIG. 12 illustrates a single track in which a writer and two readers are aligned sufficiently within the single track to facilitate a read-while-write operation for purposes of detecting a shift in the RWO of a recording head in accordance with various embodiments.

FIG. 11 illustrates a portion of a magnetic recording medium 1100 which can be used for detecting a shift in RWO of a recording head in accordance with various embodiments. The recording head depicted in FIG. 11 includes a writer, wrtr, and a multiplicity of readers. In some embodiments, the recording head can include two readers, $r_1$ and $r_2$. In other embodiments, the recording head can include three readers, $r_1$, $r_2$ and, $r_3$, as is shown in FIGS. 11 and 12. In some devices, multiple (e.g., two or more) nearly independent readers are defined and integrated in an "adjacent" reader configuration in which two or more readers are located cross-track from each other. This is sometimes referred to as two-dimensional magnetic recording (TDMR) or as multi-sensor magnetic recording (MSMR). For purposes of this disclosure, "cross-track adjacent" refers to two or more readers that are separated from each other in a cross-track direction, which is a direction at an angle to (e.g., normal or nearly normal to) the tracks of the recording medium. The readers in such a case may be aligned with each other or offset from each other in a downtrack direction, which is generally aligned with the tracks of the recording medium. The distance between the readers may vary depending on system design, e.g., track pitch, track width, interference, overlapping of readers, etc., and the term "adjacent" is not meant to limit the embodiments to a particular reader-to-reader cross track separation or alignment.

In a typical recording head, the writer and reader(s) are generally not aligned, as is shown for the representative head depicted in FIG. 11. For example, the three readers, $r_1$, $r_2$, and $r_3$, of the recording head depicted in FIG. 11 are offset laterally in a cross-track direction from each other and from the writer, wrtr. However, there may exist a skew angle where the writer, wrtr, and one or more of the readers, $r_1$, $r_2$, and $r_3$, are aligned sufficiently to provide for a read-while-write (also referred to as read after writing) capability. A read-while-write operation refers to reading data immediately after the data is written in the same revolution. One or more tracks that correspond with this skew angle can be referred to as "magic tracks" for purposes of explanation. FIG. 12 illustrates a magic track, 1102A, in which the writer, wrtr, and two readers, $r_1$ and $r_2$, are aligned sufficiently within the track 1102A to facilitate a read-while-write operation for purposes of detecting a shift in the RWO of the head within one disk revolution. For example, a recording head such as that depicted in FIG. 12 configured to implement a read-while-write operation using a magic track 1102A can complete an RWO shift detection operation within about 2-3 ms for a disk that takes about 6 ms to complete one revolution.

Figure 13:
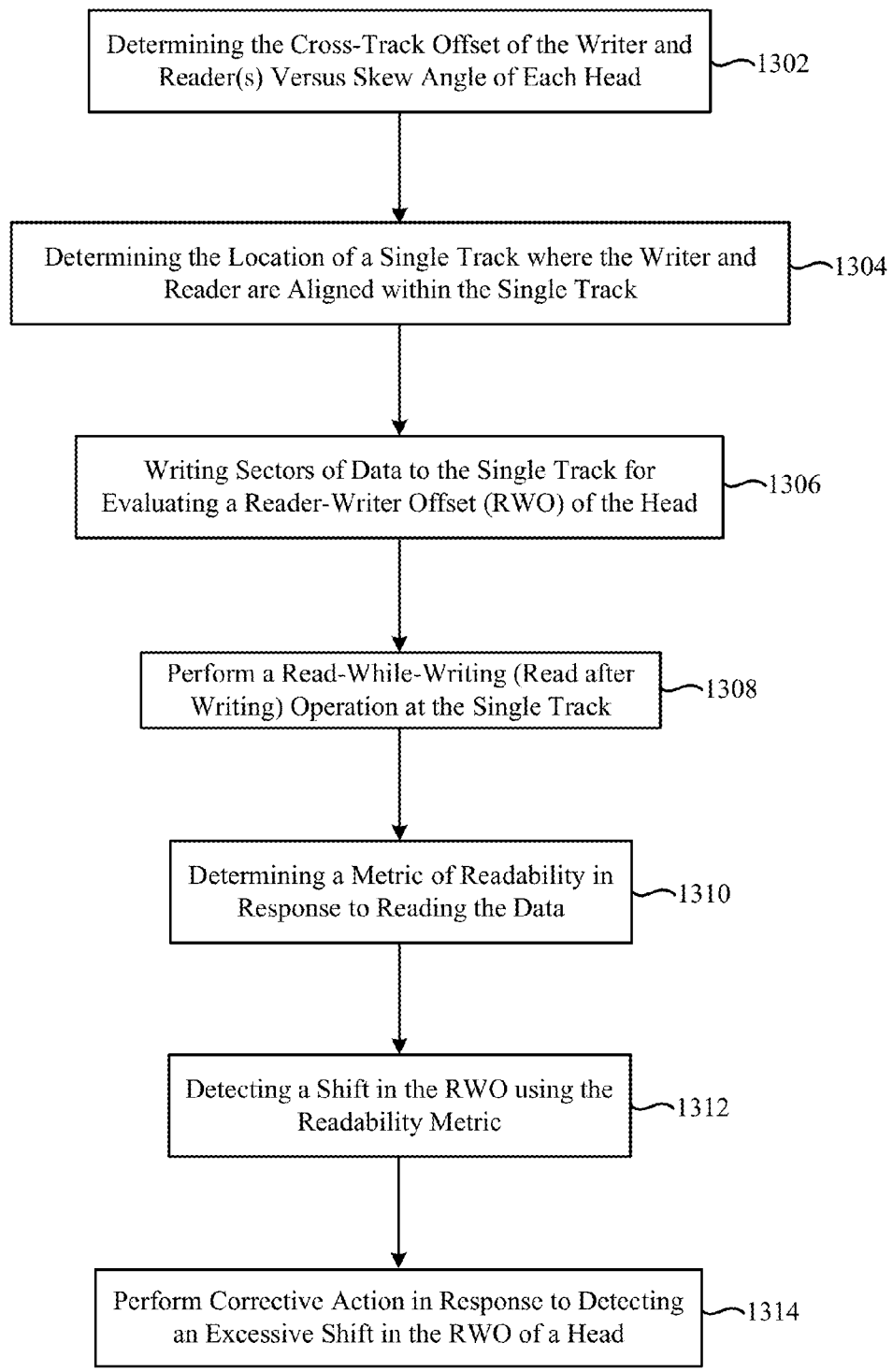
FIG. 13 illustrates various processes for detecting a shift in the RWO of a recording head using a single track of the magnetic recording medium shown in FIG. 12 in accordance with various embodiments.

FIG. 13 illustrates various processes for detecting a shift in the RWO of a recording head using a magic tracks 1102A of the magnetic recording medium 1100 shown in FIG. 12. The methodology shown in FIG. 13 involves determining 1302 the cross-track offset of the writer, wrtr, and one or more of the readers, $r_1$, $r_2$, and $r_3$, versus skew angle for each recording head of a disk drive. The methodology also involves determining 1304 the location of a single track (i.e., a magic track) on the medium 1100 where the writer, wrtr, and one or more of the readers, $r_1$, $r_2$, and $r_3$, are aligned within the single track.

One approach to determining the location of the magic track involves first determining the RWO for each of the readers (if there are multiple readers) and simply calculating from the geometry of the drive a skew angle where one of the readers is reading a portion of the track while the writer is writing it. For example, if the RWO were zero, the reader would be aligned with the writer. In this example, when the skew is zero the reader is exactly centered on the track being written. The reader need not be completely centered and only enough of the reader has to be centered to detect writing on the track. Depending on the width of the reader and writer, this can be many tracks. In the representative example of zero RWO, the magic track is a plurality of tracks centered around 0 skew. If the RWO is not zero, there will exist a track at some skew angle where the reader is centered and the magic tracks are a plurality of tracks around this point.

Data sectors are written 1306 to the single track (magic track) for evaluating the RWO of the recording head. The methodology involves performing 1308 a read-while-writing operation at the single track, and determining 1310 a metric of readability in response to reading the data from the single track. A shift in the RWO is detected 1312 using the readability metric, such as by comparing the readability metric to a predetermined threshold. Corrective action can be performed 1314 in response to detecting an excessive shift (e.g., readability metric exceeding the predetermined threshold) in the RWO of the head. As was discussed above, various forms of corrective action can be taken, such as performing further RWO characterization and changing the compensation (e.g., reader offset) for the RWO. The methodology illustrated in FIG. 13 can be repeated after the corrective action is taken and periodically thereafter.

Figure 14:
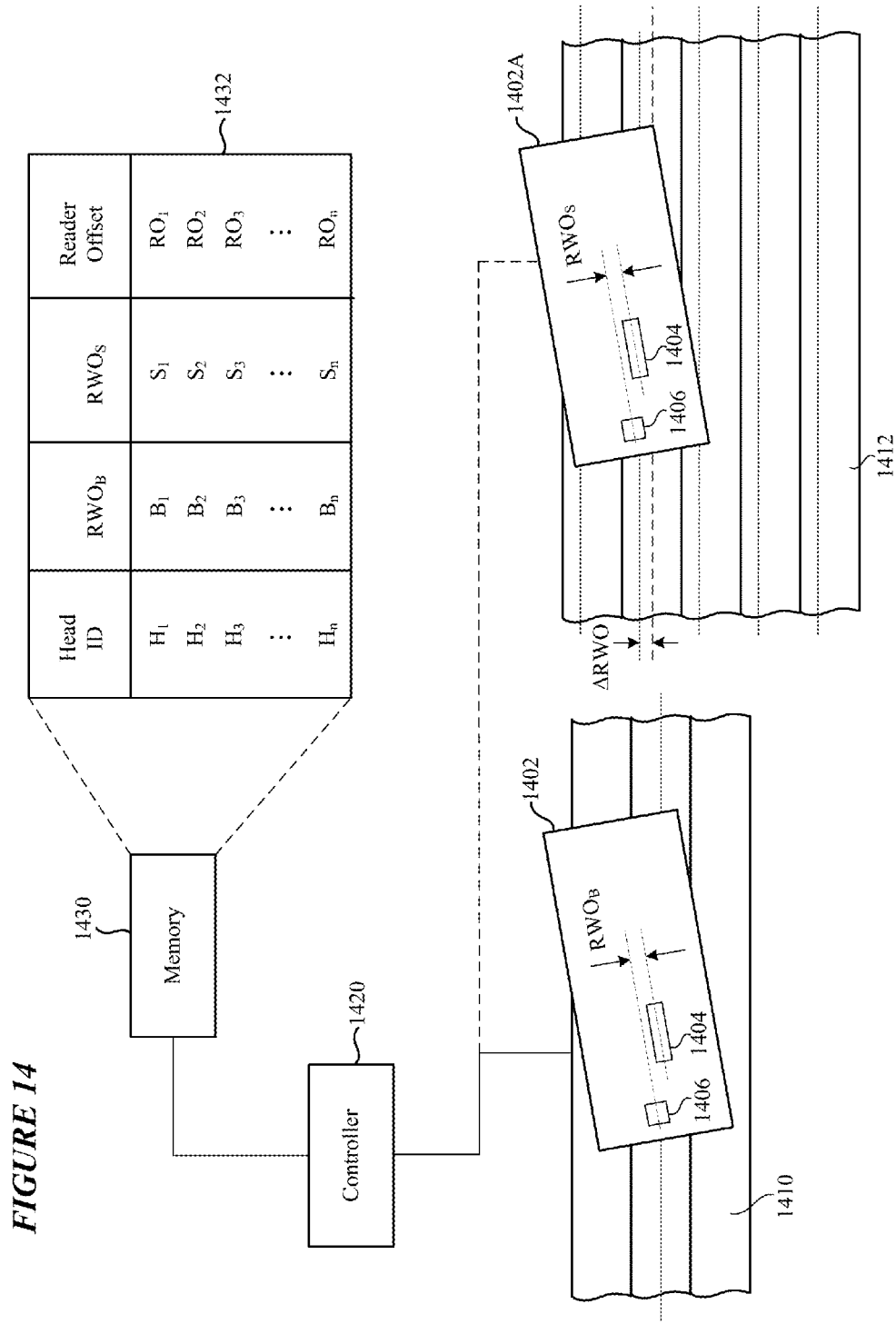
FIG. 14 is a block diagram of a system for detecting a shift in the RWO of a plurality of recording heads of a disk drive in accordance with various embodiments.

FIG. 14 is a block diagram of a system for detecting a shift in the RWO of a plurality of recording heads of a disk drive in accordance with various embodiments. In the embodiment shown in FIG. 14, a controller 1420 is coupled to a slider (recording head) 1402 and a memory 1430. For simplicity of illustration, only a single slider 1402 is shown in FIG. 14. It is understood that a multiplicity of sliders 1402 are coupled to the controller 1420 and that the memory 1430 stores and updates information about each of the sliders 1402.

The slider 1402 includes a writer 1404 and a reader 1406 shown positioned relative to a number of data tracks 1410. Although a single reader 1406 is shown in FIG. 14, two or more readers can be disposed on the slider 1402. A baseline reader-writer offset, $RWO_B$, is defined between the writer 1404 and reader 1406 of the slider 1402. FIG. 14 also shows the same slider 1402A having a shifted $RWO_S$ (relative to $RWO_B$) positioned relative to one or more tracks 1412 used as a region for RWO shift testing (e.g., the three tracks shown in FIG. 6 or FIG. 8, or the single magic track shown in FIG. 12). The shift in RWO is detected according to one of the methodologies discussed hereinabove.

The memory 1430 is configured to store various information 1432 (e.g., metadata) concerning each slider 1402 of the disk drive. The memory 1430 is preferably non-volatile memory. In the embodiment shown in FIG. 14, the memory 1430 is configured to store the identification of each recording head ($H_1$-$H_n$) of the disk drive, the baseline reader-writer offset, $RWO_B$ ($B_1$-$B_n$), of each slider 1402, and the shifted $RWO_S$ ($S_1$-$S_n$), of each slider 1402 as detected by one of the methodologies discussed hereinabove. Although simple offsets are shown, it may be appreciated that more complex characterizations of reader-writer offsets are possible; for example determining RWO-versus-track skew angle, fitting the results to coefficients of a polynomial, and storing the polynomial coefficients within the table. The memory 1430 is also configured to store a reader offset for each recording head ($RO_1$-$RO_n$). The reader offset, $RO_1$-$RO_n$, refers to the offset to be used by the controller 1420 (e.g., servo controller) to compensate for the RWO of a particular recording head during read operations. The position of a head is described by track number and then servo offset from that track number. For example, tracks can be separated by 255 servo counts. Accordingly, the reader offset can be counted in servo track offset units. These servo track offset units typically scale with the track density. For example, the servo track offset will be smaller for 50 nm tracks than for 100 nm tracks.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. For example, the RWO detection methodologies disclosed herein may be implemented for HAMR heads, conventional recording heads, and TDMR heads. Accordingly, the scope of the present disclosure should not be limited by the particular embodiments described above, but should be defined only by the claims set forth below and equivalents thereof.

What is claimed is:

1. An apparatus, comprising:
    a heat-assisted magnetic recording head configured to write to and read from a magnetic recording medium, the head comprising a reader and a writer including a near-field transducer (NFT), the reader comprising a reader center which is laterally offset relative to a writer center of the writer to define a reader-writer offset (RWO) therebetween;
    a magnetic recording medium comprising a plurality of tracks, the plurality of tracks comprising at least one track used as a region to test for a shift in the RWO resulting from a change in an amount the reader center is laterally offset relative to the writer center due to changes in the NFT; and
    a processor coupled to the recording head and configured to detect the RWO shift in response to reading data from the at least one track by the reader.

2. The apparatus of claim 1, wherein the RWO test region is reserved from storing user data and comprises at least three adjacent tracks.

3. The apparatus of claim 1, wherein the RWO test region comprises at least three adjacent tracks, the three adjacent tracks comprising:
    a central track comprising sectors of data;
    a first outer track adjacent a first edge of the central track and comprising sectors of data written at lateral offsets progressively closer to the center track; and
    a second outer track adjacent a second edge of the central track and comprising sectors of data written at lateral offsets progressively closer to the center track.

4. The apparatus of claim 1, wherein the RWO test region comprises a single track where the reader and the writer substantially align within the single track due to a skew angle of the recording head relative to a location of the single track on the medium.

5. The apparatus of claim 4, wherein the processor is configured to detect the RWO shift within one revolution of the medium.

6. The apparatus of claim 4, wherein the processor is configured to write data to and read data from the single track according to a read-while-write methodology.

7. The apparatus of claim 1, wherein the processor is configured to determine a metric of readability in response to reading data from the RWO test region and to detect a shift in the RWO using the readability metric.

8. The apparatus of claim 7, wherein the readability metric comprises one or more of bit error rate (BER), track BER center offset, off-track read capability (OTC) location, and a sectors recoverable metric.

9. The apparatus of claim 7, wherein the processor is configured to compare the readability metric to a threshold and generate a signal in response to the readability metric exceeding the threshold.

10. The apparatus of claim 1, wherein the head comprises a plurality of readers, at least two of which are laterally spaced apart so at to align over disparate tracks.

11. The apparatus of claim 1, wherein the processor is coupled to memory and configured to store RWO shift data in the memory.

12. The apparatus of claim 1, wherein the processor is configured to determine a reader offset to compensate for the RWO shift.

13. A method, comprising:
moving a heat-assisted magnetic recording head relative to a magnetic recording medium comprising a plurality of tracks, the head comprising a reader and a writer including a near-field transducer (NFT), the reader comprising a center which is laterally offset relative to a center of the writer to define a reader-writer offset (RWO) therebetween;
writing sectors of data to at least one track used as a region for RWO shift testing;
reading the data written to the RWO test region;
determining a metric of readability in response to reading the data; and
detecting a shift in the RWO using the readability metric.

14. The method of claim 13, wherein detecting a shift in the RWO comprises:
comparing the metric of readability to a threshold; and
detecting the shift in the RWO in response to the metric exceeding the threshold.

15. The method of claim 13, wherein:
the RWO test region comprises at least three adjacent tracks including a center track and two outer tracks;
reading sectors of data from the outer tracks;
determining a metric of readability for each of the outer tracks in response to reading the data from the outer tracks; and
detecting a shift in the RWO using the readability metrics.

16. The method of claim 13, wherein:
the RWO test region comprises:
a central track comprising sectors of data;
a first outer track adjacent the central track and comprising sectors of data written at lateral offsets progressively closer to the center track; and
a second outer track adjacent the central track and comprising sectors of data written at lateral offsets progressively closer to the center track;
reading data from the first and second outer tracks;
determining a metric of readability for each of the first and second outer tracks in response to reading the data from the first and second outer tracks; and
detecting a shift in the RWO using the readability metrics.

17. The method of claim 16, further comprising:
writing data to the first outer track by progressively moving the writer from a centerline of the first outer track to discrete positions successively closer to and encroaching the center track;
writing data to the second outer track by progressively moving the writer from a centerline of the second outer track to discrete positions successively closer to and encroaching the center track; and
writing data to the center track after writing the data to the first and second outer tracks.

18. The method of claim 13, wherein the RWO test region comprises a single track where the reader and the writer substantially align within the single track due to a skew angle of the recording head relative to a location of the single track on the medium, the method further comprising:
writing sectors of data to the single track;
reading the data written to the single track;
determining a metric of readability in response to reading the data; and
detecting a shift in the RWO using the readability metric.

19. The method of claim 13, further comprising:
taking a corrective action in response to detecting the RWO shift; and
repeating writing, reading, determining, and detecting subsequent to taking the corrective action.

20. An apparatus, comprising:
a recording head configured to write to and read from a magnetic recording medium, the head comprising a reader, a writer, and a reader center which has a lateral offset relative to a writer center of the writer to define a reader-writer offset (RWO) therebetween;
a magnetic recording medium comprising a plurality of tracks, the plurality of tracks comprising at least one track used as a region to test for a shift in the RWO resulting from a change in the lateral offset between the reader center and the writer center; and
a processor coupled to the recording head and configured to detect the RWO shift in response to reading data from the at least one track by the reader and determining a readability metric.

* * * * *